No. 632,687. Patented Sept. 12, 1899.
D. N. AKARD.
INVALID CUP.
(Application filed Sept. 22, 1898.)
(No Model.)
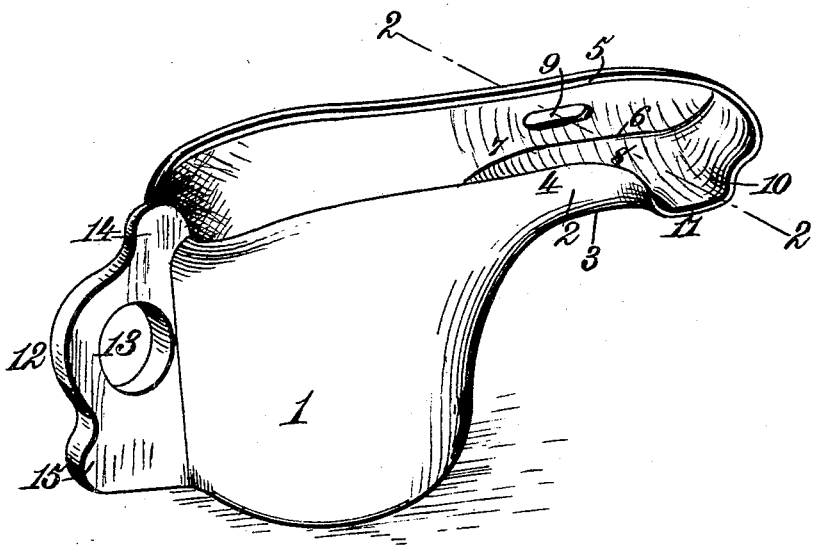
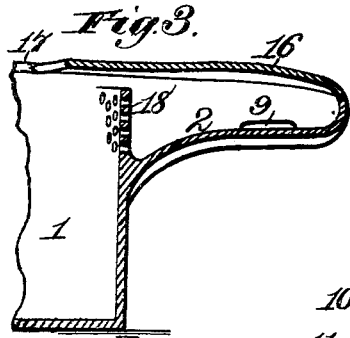
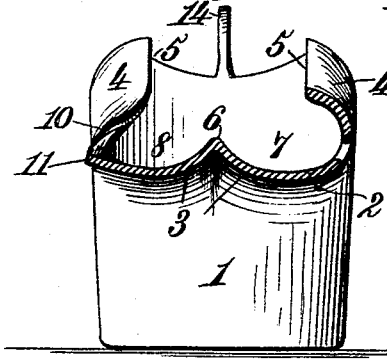
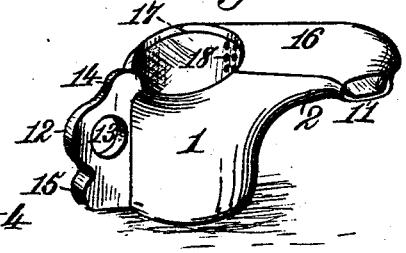
Witnesses.
Robert Everett,
H. B. Keefer
Inventor.
David N. Akard.
By James L. Norris.
Atty.

UNITED STATES PATENT OFFICE.

DAVID N. AKARD, OF MILL POINT, TENNESSEE.

INVALID-CUP.

SPECIFICATION forming part of Letters Patent No. 632,687, dated September 12, 1899.

Application filed September 22, 1898. Serial No. 691,615. (No model.)

*To all whom it may concern:*

Be it known that I, DAVID N. AKARD, a citizen of the United States, residing at Mill Point, in the county of Sullivan and State of Tennessee, have invented new and useful Improvements in Invalid Cups or Vessels, of which the following is a specification.

This invention relates to invalid cups or vessels, and has for its object to provide a cup or vessel so constructed that an invalid while in a recumbent or reclining position may drink or take liquid nourishment from the cup with ease and comfort and without liability of spilling any of the liquid upon his person or couch.

To this end my invention consists in a cup or vessel constructed in the manner hereinafter described, and particularly pointed out in the claims following the description, reference being had to the accompanying drawings, forming a part of this specification, wherein—

Figure 1 is a perspective view of my improved cup or vessel, and Fig. 2 is a transverse section taken on the line 2 2 of Fig. 1. Fig. 3 is a partial sectional view, and Fig. 4 a perspective view, of slightly-modified forms of construction.

Referring to the drawings, the numeral indicates the body or bowl of the vessel, which may be of the cup shape, as shown, or of any suitable or preferred configuration. From one side of the bowl 1 of the vessel projects a spout 2, the bottom 3 of which is slightly inclined upward and its inner end preferably curves downward, as shown, and is gradually merged into the front vertical wall of the cup to afford an easy flow of the liquid from the bowl into the spout when the vessel is tipped in the proper direction. The sides 4 of the spout form, practically, a continuation of the sides of the vessel and extend upward from the opposite edges of the bottom and around its end, the upper edges of said sides and end being turned inwardly, as at 5, to prevent the liquid from running out or flowing over when the vessel is in use. In the bottom 3 of the spout is formed an upwardly-projecting tongue or partition 6, which extends centrally and longitudinally from the inner to the outer end of the spout, forming two separate and distinct channels 7 and 8. Near the outer end of the spout and in the side 4 of the channel 7 is formed a slot 9, while the corresponding portion of the opposite side of the spout is cut away, as at 10, and is provided with a pouring-lip 11. The side of the bowl 1 of the vessel is provided with a handle 12, having a finger-opening 13, as usual, and on the upper and lower sides of the handle are formed webs or flanges 14 and 15, for the purpose hereinafter explained.

The operation of my improved vessel is as follows: The bowl of the vessel is partially filled with the liquid to be administered to the invalid, and the aperture 9 or pouring-lip 11 is applied to his lips, when by tipping the bowl of the vessel slightly upward and the spout slightly over toward the face of the patient the liquid will slowly flow through one of the channels 7 or 8 and out through the aperture or pouring-spout into the mouth of the invalid. By providing the handle with the webs or flanges 14 and 15 the operation of tilting or tipping the spout is greatly facilitated, as by inserting the forefinger in the opening 13 and applying the thumb and second finger, respectively, to the opposite sides of the flanges 14 and 15 a purchase is afforded that enables the vessel to be tipped or tilted with ease and certainty. When the vessel is removed from the patient's lips, the liquid left remaining in the spout will flow back over the inclined bottom of the spout into the bowl of the vessel without any liability of the same being spilled on the person or couch of the invalid.

I have shown the spout provided on one side with an orifice or aperture 9 and on the opposite side with a pouring-lip 11; but I wish it to be understood that the apertures or orifices 9 may be formed on both sides or that pouring-lips only may be provided. By providing an orifice 9 on one side and a pouring-lip 11 on the other, however, two differently-shaped outlets are provided, either of which may be used, as may be best suited for the immediate purpose in hand. The central partition 6 serves to direct the liquid into or confine it to the channel communicating with the outlet used for the time being, and by providing outlets on the opposite sides of the spout the vessel is made right and left handed—that is to say, the liquid may be administered from either side of the invalid.

Instead of making the spout open at the top or upper side, as described, I may form it closed—that is to say, the sides of the spout may be continued across at the top and caused to meet, thus forming a covered spout—or it may be provided with a removable cover 16, (see Figs. 3 and 4,) that is adapted to slide in grooves 17, formed in the edges of the sides of the spout. A sieve or perforated partition 18 may also be formed in the rear portion of the spout, as most clearly shown in Fig. 3, which operates to prevent any solid matter in the cup—such as ice, for example—from entering the spout.

Having described my invention, what I claim is—

1. An invalid-cup consisting of a bowl provided with a spout extending from one side thereof and closed at its end, two channels formed longitudinally in said spout and communicating at their inner ends with the bowl, and outlets formed in the opposite sides of the spout and respectively communicating with the said channels, substantially as described.

2. An invalid-cup consisting of a bowl provided with a spout extending from one side thereof and closed at its end, said spout having an elongated drinking-orifice formed in one side and a pouring-spout formed in its opposite side, substantially as described.

In testimony whereof I have hereunto set my hand in presence of two subscribing witnesses.

DAVID N. AKARD.

Witnesses:
J. H. BARNES,
N. D. BARNES.